US009860154B2

(12) United States Patent
Balabine et al.

(10) Patent No.: US 9,860,154 B2
(45) Date of Patent: *Jan. 2, 2018

(54) STREAMING METHOD AND SYSTEM FOR PROCESSING NETWORK METADATA (71) Applicant: NetFlow Logic Corporation, Atherton, CA (US)

(72) Inventors: Igor Balabine, Menlo Park, CA (US); Alexander Velednitsky, Menlo Park, CA (US)

(73) Assignee: NETFLOW LOGIC CORPORATION, Atherton, CA (US)

(*) Notice: Subject to any disclaimer, the term of this patent is extended or adjusted under 35 U.S.C. 154(b) by 0 days.

This patent is subject to a terminal disclaimer.

(21) Appl. No.: 15/004,614

(22) Filed: Jan. 22, 2016

(65) Prior Publication Data

US 2016/0234094 A1    Aug. 11, 2016

Related U.S. Application Data (63) Continuation of application No. 13/830,924, filed on Mar. 14, 2013, now abandoned, and a
(Continued)

(51) Int. Cl.
H04L 12/26 (2006.01)
H04L 29/08 (2006.01)
(Continued)

(52) U.S. Cl.
CPC ............ *H04L 43/18* (2013.01); *G06F 21/55* (2013.01); *H04L 41/069* (2013.01); *H04L 43/04* (2013.01);
(Continued)

(58) Field of Classification Search
CPC ...... H04L 63/14; H04L 63/0245; G06F 21/50
(Continued)

(56) References Cited

U.S. PATENT DOCUMENTS 7,633,944 B1    12/2009 Chang et al.
7,653,633 B2    1/2010 Villella et al.
(Continued)

OTHER PUBLICATIONS

USPTO, ISA/US, International Search Report and Written Opinion in PCT Application No. PCT/US2014/010932, dated Jun. 3, 2014, 9 pages.
(Continued)

*Primary Examiner* — Hadi Armouche
*Assistant Examiner* — Viral Lakhia
(74) *Attorney, Agent, or Firm* — Kang S. Lim (57) ABSTRACT An improved method and system for processing network metadata is described. Network metadata may be processed by dynamically instantiated executable software modules which make policy-based decisions about the character of the network metadata and about presentation of the network metadata to consumers of the information carried by the network metadata. The network metadata may be type classified and each subclass within a type may be mapped to a definition by a unique fingerprint value. The fingerprint value may be used for matching the network metadata subclasses against relevant policies and transformation rules. For template-based network metadata such as NetFlow v9, an embodiment of the invention can constantly monitor network traffic for unknown templates, capture template definitions, and informs administrators about templates for which custom policies and conversion rules do not exist. Conversion modules can efficiently convert selected types and/or subclasses of network metadata into alternative metadata formats.

8 Claims, 8 Drawing Sheets

Related U.S. Application Data continuation-in-part of application No. 13/669,235, filed on Nov. 5, 2012, now Pat. No. 9,392,010.

(60) Provisional application No. 61/751,243, filed on Jan. 10, 2013, provisional application No. 61/699,823, filed on Sep. 11, 2012, provisional application No. 61/556,817, filed on Nov. 7, 2011.

(51) Int. Cl.
*G06F 21/55* (2013.01)
*H04L 29/06* (2006.01)
*H04L 12/24* (2006.01)
*H04L 12/859* (2013.01)

(52) U.S. Cl.
CPC ........ *H04L 47/2475* (2013.01); *H04L 63/102* (2013.01); *H04L 63/1425* (2013.01); *H04L 63/20* (2013.01); *H04L 67/02* (2013.01); *H04L 2463/144* (2013.01)

(58) Field of Classification Search
USPC .................. 370/230, 241; 726/6–8; 713/150
See application file for complete search history.

(56) References Cited

U.S. PATENT DOCUMENTS

| | | | |
|---|---|---|---|
| 7,724,728 B2 | 5/2010 | Pullela et al. | |
| 7,996,427 B1 | 8/2011 | Flick et al. | |
| 8,011,010 B2 | 8/2011 | Michael et al. | |
| 8,359,320 B2 | 1/2013 | Howcroft et al. | |
| 8,418,233 B1* | 4/2013 | Hughes | H04L 63/08 713/153 |
| 8,483,056 B2* | 7/2013 | Chen | H04L 63/1416 370/230 |
| 8,484,737 B1 | 7/2013 | Swift et al. | |
| 8,503,302 B2 | 8/2013 | Golic et al. | |
| 8,561,187 B1* | 10/2013 | Hegli | H04L 63/1491 726/22 |
| 8,578,493 B1* | 11/2013 | Cowan | G06F 21/554 709/224 |
| 8,611,219 B2 | 12/2013 | Golic | |
| 8,627,477 B2* | 1/2014 | Chen | H04L 29/12367 726/24 |
| 8,631,022 B2 | 1/2014 | Howcroft et al. | |
| 8,914,406 B1 | 12/2014 | Haugsnes et al. | |
| 2002/0001395 A1 | 1/2002 | Davis et al. | |
| 2002/0083175 A1 | 6/2002 | Afek et al. | |
| 2007/0033190 A1 | 2/2007 | Dodaro et al. | |
| 2007/0115850 A1 | 5/2007 | Tsuchiya et al. | |
| 2007/0156919 A1* | 7/2007 | Potti | G06F 8/67 709/238 |
| 2007/0234426 A1 | 10/2007 | Khanolkar et al. | |
| 2008/0177755 A1* | 7/2008 | Stern | G06F 21/568 |
| 2009/0016236 A1 | 1/2009 | Alcala et al. | |
| 2009/0019458 A1 | 1/2009 | Katari et al. | |
| 2010/0011031 A1 | 1/2010 | Huang et al. | |
| 2010/0071065 A1 | 3/2010 | Khan et al. | |
| 2010/0162399 A1* | 6/2010 | Sheleheda | H04L 63/1416 726/24 |
| 2011/0004876 A1 | 1/2011 | Wu et al. | |
| 2011/0113109 A1 | 5/2011 | LeVasseur et al. | |
| 2011/0288692 A1* | 11/2011 | Scott | G06F 21/55 700/297 |
| 2012/0011589 A1* | 1/2012 | Chen | H04L 29/12367 726/24 |
| 2012/0017262 A1 | 1/2012 | Kapoor et al. | |
| 2012/0096513 A1* | 4/2012 | Raleigh | H04W 24/10 726/1 |
| 2012/0096525 A1* | 4/2012 | Bolgert | G06F 11/3065 726/6 |
| 2012/0180104 A1* | 7/2012 | Gronich | H04L 63/20 726/1 |
| 2012/0240236 A1* | 9/2012 | Wyatt | G06F 21/564 726/25 |
| 2012/0284791 A1 | 11/2012 | Miller et al. | |
| 2013/0064096 A1* | 3/2013 | Degioanni | H04L 67/1097 370/241 |
| 2013/0148498 A1* | 6/2013 | Kean | H04L 41/0893 370/230 |
| 2013/0298254 A1 | 11/2013 | Hall et al. | |
| 2014/0059678 A1* | 2/2014 | Parker | H04L 63/20 726/22 |
| 2014/0075557 A1 | 3/2014 | Balabine et al. | |

OTHER PUBLICATIONS

Open Network Foundation, "Software-Defined Networking: The New Norm for Networks", (online) published Apr. 13, 2012 (retrieved on May 20, 2014) URL:https://www.opennetworking.org/images/stories/download/sdn-resources/white-papers/wp-sdn-newborm.pfd, 12 pages.

Korean Intellectual Property Office, ISA/KR, "International Search Report and Written Opinion" in PCT Application No. PCT/US2012/063749, dated Feb. 25, 2013, 12 pages.

* cited by examiner

STREAMING METHOD AND SYSTEM FOR PROCESSING NETWORK METADATA

CROSS REFERENCE TO RELATED APPLICATIONS

This Continuation application claims priority to U.S. application Ser. No. 13/830,924 filed Mar. 14, 2013, which claims the benefit of provisional application No. 61/751,243 filed Jan. 10, 2013, entitled "An Improved Streaming Method and System for Processing Network Metadata", and also claims the benefit of U.S. provisional application No. 61/699,823, filed Sep. 11, 2012, entitled "A Streaming Method and System for Processing Network Metadata", which applications are incorporated herein in their entirety by this reference.

This Continuation application also claims the benefit of U.S. application Ser. No. 13/669,235, filed Nov. 5, 2012, entitled "A Streaming Method and System for Processing Network Metadata" which claims the benefit of U.S. provisional application No. 61/556,817 filed Nov. 7, 2011, entitled "A Streaming Method and System for Processing Network Metadata", which applications are incorporated herein in their entirety by this reference.

FIELD OF THE INVENTION

In general the present invention relates to network monitoring and event management. More specifically it relates to processing of network metadata obtained through network monitoring activities and a subsequent processing of the metadata, which may efficiently result in useful information being reported in a timely manner to a consumer of the metadata.

BACKGROUND

Network monitoring is a critical information technology (IT) function often used by Enterprises and Service Providers, which involves watching the activities occurring on an internal network for problems related to performance, misbehaving hosts, suspicious user activity, etc. Network monitoring is made possible due to the information provided by various network devices. The information has been generally referred to as network metadata, i.e., a class of information describing activity on the network which is supplemental and complimentary to the rest of information transmitted over the network.

Syslog is one type of network metadata commonly used for network monitoring. Syslog is a standard for logging program messages and provides devices which would otherwise be unable to communicate a means to notify administrators of problems or performance. Syslog is often used for computer system management and security auditing as well as generalized informational, analysis, and debugging messages. It is supported by a wide variety of devices (like printers and routers) and receivers across multiple platforms. Because of this, syslog can be used to integrate log data from many different types of systems into a central repository.

More recently, another type of network metadata, referred to by various vendors as NetFlow, jFlow, sFlow, etc., has also been introduced as a part of standard network traffic (hereafter generally referred to as "NetFlow".) NetFlow is a network protocol for collecting IP traffic information that has become an industry standard for traffic monitoring. NetFlow can be generated by a variety of network devices such as routers, switches, firewalls, intrusion detection systems (IDS), intrusion protection systems (IPS), network address translation (NAT) entities and many others. However, until recently, NetFlow network metadata was used exclusively for post factum network supervision purposes such as network topology discovery, locating network throughput bottlenecks, Service Level Agreement (SLA) validation, etc. Such limited use of NetFlow metadata can generally be attributed to the high volume and high delivery rate of information produced by the network devices, the diversity of the information sources and an overall complexity of integrating additional information streams into existing event analyzers. More particularly, NetFlow metadata producers have typically generated more information than consumers could analyze and use in a real time setting. For example, a single medium to large switch or router on a network might generate 400,000 NetFlow records per second.

Today's syslog collectors, syslog analyzers, security information management (SIM) systems, security event management (SEM) systems, security information and event management (SIEM) systems, etc. (collectively hereafter referred to as an "SIEM system") are either incapable of receiving and analyzing NetFlow, are limited to processing rudimentary information contained in NetFlow packets, or process NetFlow packets at rates much lower than such packets are typically generated.

The advent of robust network monitoring protocols such as NetFlow v9 (RFC 3954) and IPFIX (RFC 5101 and related IETF RFC) drastically expands the opportunity to use network metadata in the realm of network security and intelligent network management. At the same time, due to the constraints identified above, today's SIEM systems are not generally capable of utilizing network monitoring information beyond simply reporting observed byte and packet counts.

SUMMARY OF THE INVENTION

Network managers and network security professionals continuously confront and struggle with a problem often referred to in the industry as "Big Data". Some of the issues created by the Big Data problem include an inability to analyze and store massive amounts of machine-generated data that often exists in different formats and structures. The problems commonly experienced can be summarized as follows:

1. Too much data to analyze in real time to acquire timely insight into network conditions.
2. Data arrives in different formats from different device types on a network, making correlation of data from different device types difficult and slow; and
3. Too much data to store (e.g., for later analysis and/or for compliance with data retention requirements).

The present invention provides a system and method capable of addressing all of the above-identified problems associated with Big Data by providing the ability to analyze large volumes of metadata in real time, convert large volumes of metadata into a common format that allows ready correlation with other data within a single monitoring system, and dramatic reduction in the volume of the incoming data through real time data reduction techniques such as packet validation, filtering, aggregation and de-duplication.

Embodiments of the present invention are able to check the validity of incoming packets of network metadata and discard malformed or improper messages. Embodiments are also able to examine and filter incoming packets of network metadata in real time to identify relevant aspects of their information content and segment or route different streams of incoming network metadata for differing processing within the processing engine of the present invention. Included in such differing processing is the opportunity to reduce output metadata traffic by dropping particular messages or selected streams of messages based upon criteria that can be configured by a network manager and determined during the early examination of incoming messages. This enables a network manager to focus the network analysis, either on an ongoing basis or temporarily in response to a particular network condition. As an example, a network manager can elect to focus attention upon network metadata within the system that is generated only be the edge devices on the network to investigate possible intrusion events.

Embodiments of the present invention are further able to aggregate the information content contained in incoming packets of network metadata and replace a large quantity of related packets with one or a much smaller number of other packets that capture the same information but generate a much smaller downstream display, analysis and storage requirement than the original metadata flow.

Embodiments of the present invention are further able to de-duplicate the content of the normal metadata flow generated by the network devices. Because incoming traffic is typically routed within the network through a sequence of network devices to its destination device, and because each network device typically generates network metadata for each flow that traverses it, a significant amount of redundant metadata is generated that contributes to the Big Data problem in the industry.

The present invention relates to a system and method capable of receiving arbitrary structured data, e.g., network or machine-generated metadata, in a variety of data formats (hereafter network metadata), efficiently processing the network metadata and forwarding the received network metadata and/or network metadata derived from the original network metadata in a variety of data formats. Network metadata could be generated by a variety of network devices such as routers, switches, firewalls, intrusion detection systems (IDS), intrusion protection systems (IPS), network address translation (NAT) entities and many others. The network metadata information is generated in a number of formats including but not limited to NetFlow and its variants, (e.g., jFlow, cflowd, sFlow, IPFIX), SNMP, SMTP, syslog, etc. The method and system described herein is able to output network metadata information in a number of formats including but not limited to NetFlow and its versions, (jFlow, cflowd, sFlow, IPFIX) SNMP, SMTP, syslog, OpenFlow, etc. In addition, embodiments of the invention are able to output selected types of network metadata information at a rate sufficient to allow real-time or near-real-time network services to be provided. As a result, the system is capable of providing meaningful services in deployments with N (N≥1) producers of the network metadata and M (M≥1) consumers of the original or derived network metadata. It may be appreciated that a particular embodiment of this invention aligns with a definition of IPFIX Mediator as reflected in RFC 5982.

An embodiment of the present invention provides a method and system for identifying the nature, character and/or type ("class") of received network metadata and organizing received information into categories or classes. This may be of particular usefulness when used in association with NetFlow v9 and similar messages that are template-based and can be of widely varied content and purpose. Once categorized or classified, each individual class member instance can be further processed according to zero, one or a plurality of class specific processing rules or according to a default processing rule ("policies"). This aspect of the invention enables fine grain processing of an unlimited variety of network metadata types.

By identifying the class of incoming network metadata at an early stage of the operation, the embodiment is able to efficiently organize the processing of network metadata, and in appropriate circumstances, reduce the amount of processing required by filtering, consolidating and/or eliminating portions of the network metadata that is of limited interest to the system administrator, thereby contributing to the real-time or near-real-time operation of the system and potentially reducing storage requirements at a network metadata collector. For example, as a particular body of network traffic traverses multiple devices in a network, network metadata may be generated from each traversed device that contains redundant information. Depending upon the focus or areas of monitoring defined within the SIEM system, it may be desirable to filter, aggregate, consolidate or eliminate metadata records containing redundant information from the metadata flow forwarded to the SIEM system. Policies can be introduced that remove redundancies from certain classes of network metadata that are directed to the SIEM system, while at the same time preserving all such metadata for the flow that is directed to a collector.

It will thus be appreciated that the policies implemented by embodiments of the invention can be defined in a manner that supports and/or are coordinated with policies or areas of focus of a SIEM system and/or metadata collector that is operating within the network.

Policies can be introduced for the purpose of detecting important or unusual network events that might be indicative of security attacks, reporting traffic spikes on the network, detecting attacks on the network, fostering better usage of network resources, and/or identifying applications running on the network, for network management and security purposes. Policies can be general purpose or time-based, and can be applied to a specific class or a subset of the network metadata passing through the network. An embodiment of the invention contemplates the provision of multiple working threads that operate in cooperation with multiple policy modules to increase system throughput and performance.

Working threads can be introduced that are specialized or tuned for use with a particular class or subclass of network metadata to further enhance system performance and throughput. Such specialized working threads and policy modules can perform processing operations on different portions of the stream of network metadata in parallel to enhance system performance and throughput. Further, in response to a heavy volume of a particular class or subclass of network metadata, multiple instances of the specialized working thread and/or policy module can be instantiated to operate in parallel to further enhance system performance and throughput.

For example, an embodiment of this invention provides a unique capability of detecting externally controlled network hosts ("botnet member") residing on an internal network. Consider an infected network host operated by a central controller ("botnet master"). Typically, detection of malicious content on a network host requires installing a dedicated plug-in module on that host. This method does not work against sophisticated malicious agents ("rootkit") which are undetectable by any host-based means. An embodiment of the present invention introduces a policy which is able to identify and notify a security system about an act of communication between a botnet master and a botnet member on the internal network.

Due to the use of the network metadata information, intelligence provided by the present invention achieves a higher degree of trustworthiness than intelligence provided by similar-in-purpose devices exposed to the network traffic. For example, an in-line Intrusion Detection System (IDS) or Intrusion Detection System (IPS) exposed to malicious traffic could be compromised or subject to a Denial of Service ("DoS") attack while the present invention can be deployed on an internal network inaccessible to such attackers.

Furthermore, the present invention enables transforming network metadata which makes it suitable for deployments which require network metadata obfuscation.

According to another embodiment of the present invention, the method and system may be implemented in a streaming fashion, i.e., processing the input network metadata as it arrives ("in real-time or near-real-time") without the need to resort to persistent storage of the network metadata. This embodiment of the invention allows deployment of the system and method on a computer with limited memory and storage capacity, which makes the embodiment especially well suited for deployments in a computing cloud.

After processing a class member instance according to a policy or a plurality of policies, an embodiment of the present invention may provide an efficient method for converting the results of the policies' application into zero, one or more representations ("converter") suitable for further processing by recipients of the converted network metadata or the original network metadata. As a result, the system and method disclosed herein is exceptionally well suited for deployments in existing environments where its output may be directed towards existing diverse components such as SIEM systems adapted for use with syslog metadata.

An embodiment of the invention provides a plurality of converters that may be customized for a particular class or classes of network metadata and/or output format, thereby increasing throughput of the system to better enable real-time or near-real-time services on the network. Further, in response to a heavy volume of a particular class or subclass of network metadata, multiple instances of the customized working thread and/or conversion modules can be instantiated to operate in parallel to further enhance system performance and throughput.

Furthermore, an embodiment of the present invention is able to ensure integrity of the converted network metadata by appending message authentication codes. This embodiment of the invention enables sophisticated network metadata recipients to verify authenticity of the received information.

Yet another embodiment of this invention is the ability to deploy the system and method in a fashion transparent to the existing network ecosystem. This embodiment does not require any change in the existing network components' configuration.

Another embodiment of the present invention provides a method and apparatus for describing network metadata processing and conversion rules either in visual or in textual terms or a combination thereof. Once the policies' description is complete and verified to be non-contradicting, the policies and converters applicable to a class member subject to the rules may be instantiated as one or a plurality of executable modules simultaneously derived from one or a plurality of the network metadata processing and conversion rules definitions. As a result, systemic policy consistency is achieved across a plurality of modules. Furthermore, the binary nature of the modules implementing the policies and conversion rules makes the system capable of handling the input network metadata at rates significantly exceeding processing rates in environments which interpret comparable processing rules.

BRIEF DESCRIPTION OF THE DRAWINGS

In order that the present invention may be more clearly ascertained, some embodiments will now be described, by way of example, with reference to the accompanying drawings, in which.

DETAILED DESCRIPTION OF THE INVENTION

The present invention will now be described in detail with reference to several embodiments thereof as illustrated in the accompanying drawings. In the following description, numerous specific details are set forth in order to provide a thorough understanding of embodiments of the present invention. It will be apparent, however, to one skilled in the art, that embodiments may be practiced without some or all of these specific details. In other instances, well known process steps and/or structures have not been described in detail in order to not unnecessarily obscure the present invention. The features and advantages of embodiments may be better understood with reference to the drawings and discussions that follow.

Aspects, features and advantages of exemplary embodiments of the present invention will become better understood with regard to the following description in connection with the accompanying drawing(s). It should be apparent to those skilled in the art that the described embodiments of the present invention provided herein are illustrative only and not limiting, having been presented by way of example only. All features disclosed in this description may be replaced by alternative features serving the same or similar purpose, unless expressly stated otherwise. Therefore, numerous other embodiments of the modifications thereof are contemplated as falling within the scope of the present invention as defined herein and equivalents thereto. Hence, use of absolute and/or sequential terms, such as, for example, "will," "will not," "shall," "shall not," "must," "must not," "only," "first," "initially," "next," "subsequently," "before," "after," "lastly," and "finally," are not meant to limit the scope of the present invention as the embodiments disclosed herein are merely exemplary.

In general the present invention relates to network monitoring and event management. More specifically it relates to processing network metadata obtained as a result of network monitoring activities and subsequent processing of the metadata, which may result in useful information being reported to an event management entity in a timely manner.

In the following description, the invention is disclosed in the context of network metadata processing for the purposes of illustration only. However, it will be appreciated that the invention is suitable for a broader variety of applications and uses and certain embodiments of the invention are applicable in contexts other than network metadata processing. For example, in an OpenFlow compliant environment, the system may receive NetFlow information from the network and output instructions to an OpenFlow Controller.

In one embodiment of this invention, the method and system may be implemented using a NetFlow to Syslog Converter ("NF2SL")—a software program which enables integrating NetFlow versions 1 through 8, NetFlow v9, jFlow, sflowd, sFlow, NetStream, IPFIX and similar ("NetFlow") producers with any SIEM system capable of processing syslog. The integration is achieved by converting network metadata generated by the NetFlow producers on the network into a lingua franca of network monitoring systems—syslog. Mapping of the NetFlow information to corresponding syslog information may be performed according to policies, rules and priorities established by the NF2SL Administrator.

NFI for Software Defined Networking

Software Defined Networking (SDN) is a networking architectural concept which separates network control (decision making about packet forwarding) and network topology (physical connectivity of the network devices). A typical implementation of the SDN architecture puts the decision making process on a separate computing device such as a server and leaves packet forwarding to traditional network devices such as switches and routers.

Figure 1:
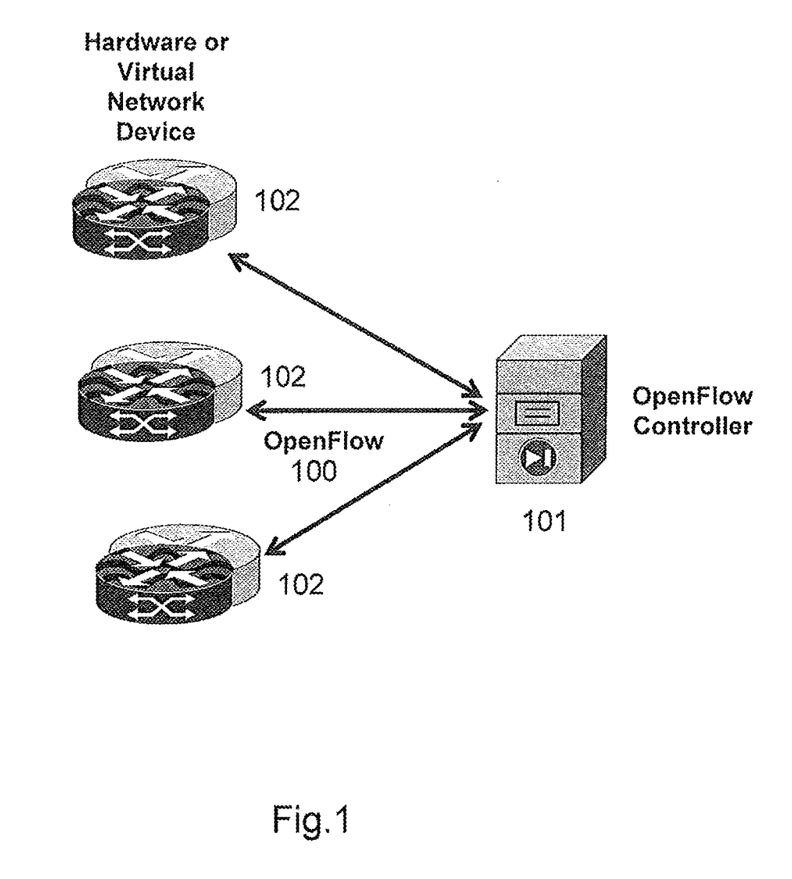
FIG. 1 provides a simplified schematic diagram of a software-defined network system including a variety of network devices that generate metadata that can be analyzed in accordance with an embodiment of the present invention.

Referring to FIG. 1, in an exemplary embodiment communications between the control plane and the data forwarding plane are carried out by means of the OpenFlow protocol 100. This protocol enables a central device, called OpenFlow Controller 101, to direct traffic through one or a plurality of OpenFlow compliant network devices 102 in its domain. In general, the OpenFlow Controller 101 may set up communications paths based on specific characteristics such as fewest number of hops, link bandwidth or latency.

The OpenFlow Controller 101 sets up communications paths using a flow table abstraction in which a flow is represented by a collection of packet fields against which each packet traversing a network device is matched. When a controlled network device 102 encounters a packet for which it does not have forwarding instructions, the network device 102 forwards the packet to the OpenFlow Controller 101 for examination and providing instructions on how to handle similar packets in the future.

The OpenFlow Controller 101 makes its decisions based on the OSI Layer 2 (local network connectivity) and OSI Level 3 (routing) network level information. The scope of information available to the OpenFlow Controller 101 makes it impossible to more efficiently make the most of network infrastructure capacity by utilizing information about the applications and the identity of the network users.

This deficiency of the OpenFlow Controller 101 could be alleviated by introducing an additional component which digests a higher level of information, such as OSI Layer 7 information (applications) and the users identity, according to a policy or a set of policies set forth by a System Administrator, and directs the OpenFlow Controller 101 how to make lower level network packets forwarding decisions taking into account such higher level information.

Figure 2:
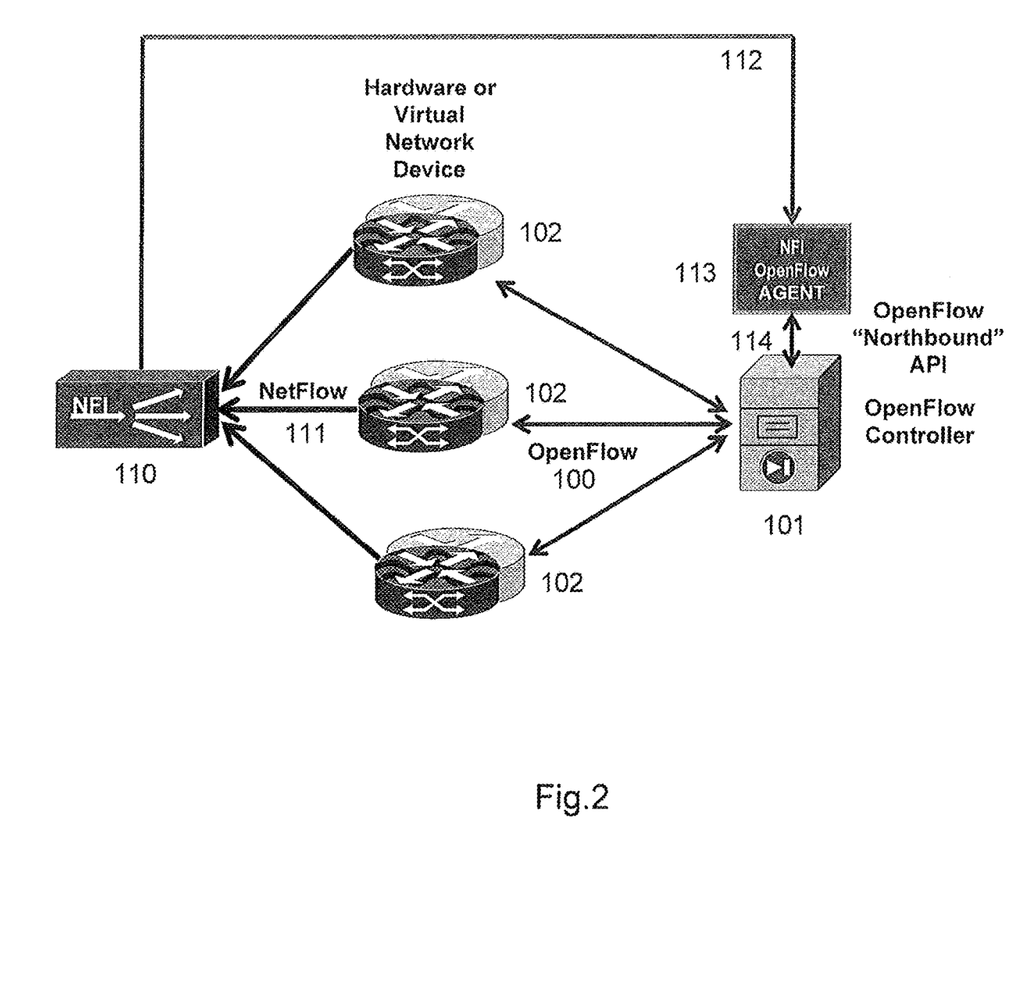
FIG. 2 provides a simplified schematic diagram of a software-defined network system including a variety of network devices that generate metadata and a system in accordance with an embodiment of the present invention for managing the network while analyzing such metadata.

Referring to FIG. 2, in an exemplary embodiment, acting through an agent, NFI Server 110 provides higher level information, including but not limited to the OSI Level 7 application-level data that enables the OpenFlow Controller 101 to make more intelligent decisions concerning how to utilize the network.

Further referring to FIG. 2, NFI Server 110 processes NetFlow information 111 generated by OpenFlow 100 compliant networking devices 102 and communicates consolidated flow data to the NFI OpenFlow Agent 113 implemented as an application capable of communicating with the OpenFlow Controller 101. In an exemplary embodiment, the communication between the NFI OpenFlow Agent 113 and the OpenFlow Controller 101 may be implemented by means of the OpenFlow "Northbound" API 114 which supports bi-directional communications between the NFI OpenFlow Agent 113 and the OpenFlow Controller 101.

It is appreciated that the NFI OpenFlow Agent 113 may communicate with a plurality of OpenFlow Controllers 101 and may receive flow related information from a plurality of NFI Servers 110. It is also appreciated that NFI Server 110 may send flow related information to a plurality of NFI OpenFlow Agents 113.

The NFI OpenFlow Agent 113 receives information about the flows, including but not limited to the OSI Level 7 application information and user identity information from the NFI Server 110 via a protected communications channel 112.

The NFI Server 110 receives OSI Level 7 application information in NetFlow messages generated by the network devices 102 and derives user information from the user-identity-aware NetFlow messages such as NetFlow Security Event Log (NSEL) or in the OSI Layer 2 extensions such as Cisco Secure Group Tags (SGT).

The OSI Level 7 application information may be supplied by means of a classification such as PANA-L7 accompanied by an application identifier or other similar application classification. The communications channel 112 may be protected by standard cryptographic means such as the SSL/TLS or the DTLS protocol.

In an exemplary embodiment, the NFI OpenFlow Agent 113 is able to retrieve information about the OSI Layer 2 (local network connectivity) and OSI Layer 3 (routing) from the OpenFlow Controller 101 by the means of the OpenFlow "Northbound" API 114. It is appreciated that the NFI OpenFlow Agent 113 may deduce the OSI Layer 2 (local network connectivity) and OSI Layer 3 (routing) information from the flow data received from the NFI Server 110 or by other means.

Further, the NFI OpenFlow Agent 113 is able to map the OSI Level 7 application information and the user identity information received from the NFI Server 110 to the policy provided by the system administrator, determine if the state of the network comprised by the network devices 102 satisfies the policy, and instruct the OpenFlow Controller 101 to apply a corrective action if such is required.

Exemplary NFI OpenFlow Agent 113 policies could include enforcement of a certain network bandwidth allocated to an application for a certain user or a group as determined by a Cisco SGT associated with the network traffic; enforcement of an SLA for a subnet classified by an IP address prefix or a VLAN tag, and so on. An exemplary policy could be expressed as a numeric threshold, in relative terms (e.g., "group A network bandwidth consumption should not exceed network bandwidth consumption of group B"), or in fuzzy terms (e.g., "if network traffic is low, network bandwidth allocated to group A may be increased"). The policies could be expressed in many forms, for example and without any limitation, as an XML, document, in a proprietary format, etc. The policies could be based on the application type derived from the OSI Level 7 application information, user or group identity, user or group role, time of day, etc.

It is appreciated that this invention could be used to increase utilization and quality of servers in the Enterprise networks, data centers, Service Provider networks, and public and private cloud environments.

It is also appreciated that the NFI OpenFlow Agent 113 is capable of utilizing NetFlow information received from the NFI Server 110 to monitor the health of the network and report potential faults prior to their happening. In an exemplary embodiment, a conclusion about an impending network fault could be made by utilizing the NetFlow protocol for measuring average size of a packet traversing a network device interface. A noticeable drop in the average packet size could indicate a higher level of the network packets fragmentation, which typically indicates faulty hardware. When the average packet size drops below a certain threshold, the NFI Server 110 may notify the NFI OpenFlow Agent 113 about this event. In turn, the NFI OpenFlow Agent 113 may instruct the OpenFlow Controller 101 to take a corrective action by rerouting the traffic around a problematic network device and/or notify the System Administrator about the problem.

In another exemplary embodiment, the NFI Server 110 may forecast a network fault by comparing dispersion of the traffic rate by volume and processed packets against preset or dynamically computed thresholds. Comparison of dispersion of the flow reports arrival time to a computed or a preset threshold could be another NFI Server 110 network fault reporting criteria.

It is appreciated that such network fault threshold values could be computed by means of fuzzy-logic-based algorithms, statistical measurements and other methods and network faults may be predicted using linear prediction algorithms such as autoregressive model, moving average model, or other predictive analytics methods. It is also appreciated that the NFI OpenFlow Agent 113 may make its decisions based on information received from a plurality of NFI Servers 110.

Furthermore, it is appreciated that a protocol used to control the data plane of the network devices 102 could be other than OpenFlow, the control plane implementation other than the OpenFlow Controller 101, the API used to communicate with the control plane could be other than the OpenFlow "Northbound" API 114, and the NFI OpenFlow Agent 113 could be co-located with the control plane or be remote. In case of co-location, the NFI OpenFlow Agent 113 could utilize a local programmatic API or interact with the control plane using a network protocol.

An obvious benefit of integrating the application level information into the packet forwarding function is the simplicity in which the network administrator could express the network bandwidth utilization policies. This leads to a more optimal use of the existing network resources and increased customer satisfaction due to a better fulfillment of the existing SLA.

NFI for Infrastructure as a Service

Infrastructure as a Service (IaaS) is a cloud computing provisioning model in which organizations outsource computing operations including servers, network and storage to a service provider. The provider owns, operates and maintains the hardware. In addition, individual organizations could also pool their existing local computing resources and provide a private IaaS offering limited to use exclusively by the organization.

Figure 3:
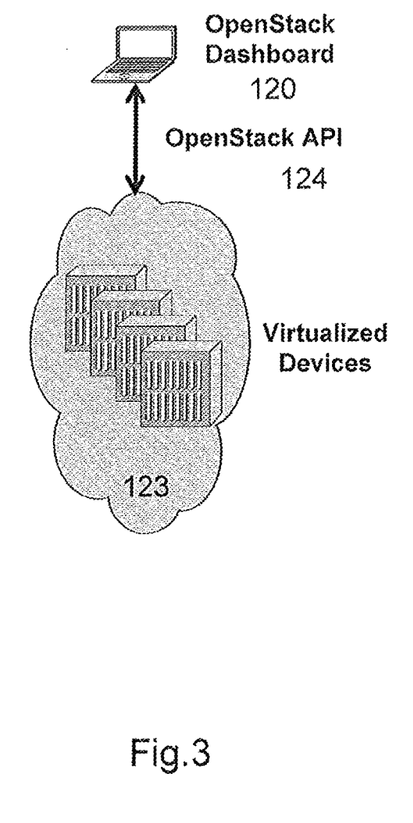
FIG. 3 provides a simplified schematic diagram of a cloud-based network system including a variety of network devices that generate metadata that can be analyzed in accordance with an embodiment of the present invention.

Referring to FIG. 3, OpenStack is a vendor independent cloud operating system designed to control large groups of computing resources, including servers, storage and networking devices, and manage those resources through a console called an OpenStack Dashboard 120.

In an exemplary embodiment, the OpenStack system could be used by a service provider to manage its IaaS offering or by an organization to manage its own pool of computing resources.

Further referring to FIG. 3, the OpenStack system provides a collection of web-based APIs, called OpenStack API 124 (OpenStack Compute, OpenStack Object Storage, OpenStack Identity Service, and OpenStack Image Store), which allow provisioning and manipulating virtual devices deployed in a cloud. The OpenStack API 124 enables cloud operators to provision cloud infrastructure, including virtual machine (VM) instances, storage and identity services, and manipulate Virtualized Devices 125 deployed in a Cloud 123. The OpenStack system provides a number of tools, such as cURL, rest-client, nova, etc., for utilizing the OpenStack system services such as launching a Virtual Device 125, checking Virtual Device 125 status, shutting down a Virtual Device 125, and so on.

Figure 4:
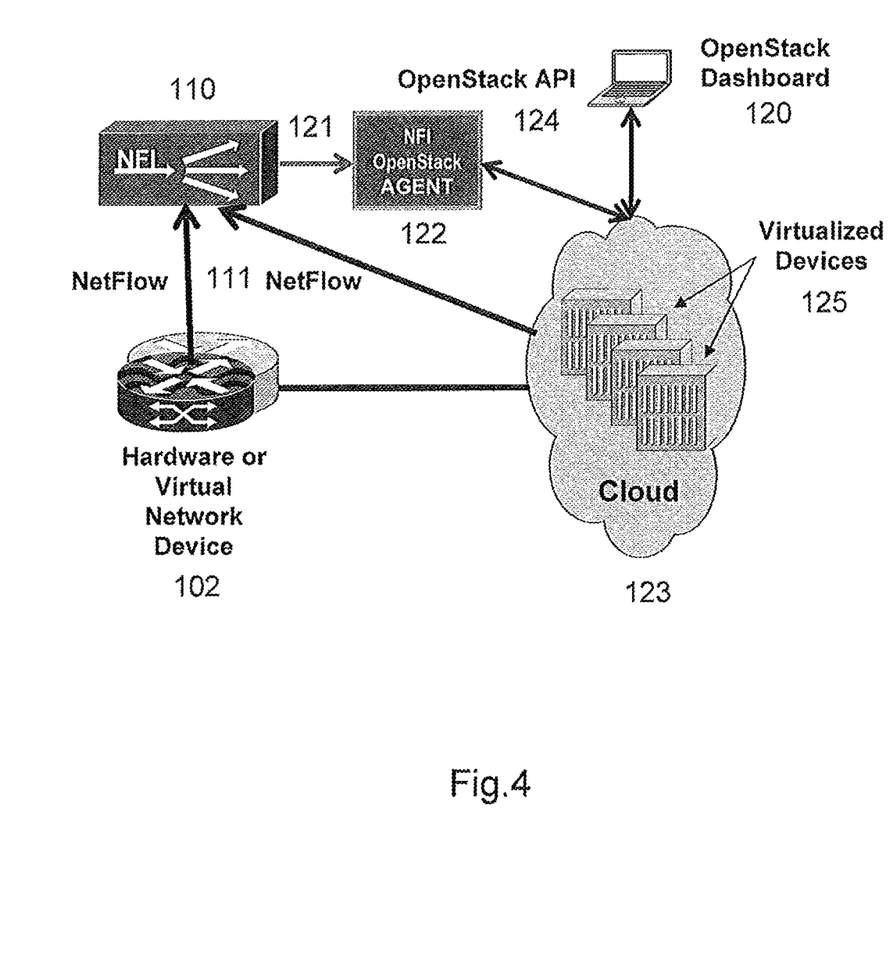
FIG. 4 provides a simplified schematic diagram of a cloud-based network system including a variety of processing modules that cooperate to automate the network while analyzing metadata in accordance with an embodiment of the present invention.

Referring to FIG. 4, a robust OpenStack API 124 provides an opportunity to automate the OpenStack-based system provisioning and maintenance by utilizing the NetFlow information 111 reported by the Hardware or Virtual Network Devices 102. Furthermore, NetFlow 111 information reported by VM hypervisors provides a complete insight into the state of Virtualized Devices 125 by the means of the NFI Server 110.

Further referring to FIG. 4, the NFI Server 110 processes NetFlow information 111 generated by Hardware or Virtual Network Devices 102 and Virtualized Devices 125 and communicates consolidated flow data to the NFI OpenStack Agent 122 implemented as an application capable of communicating with the OpenStack controlled Virtualized Devices 125 deployed in the Cloud 123. In an exemplary embodiment, the communication between the NFI OpenStack Agent 122 and the OpenStack controlled Cloud 123 may be implemented by means of the OpenStack API 124 which supports bi-directional communications between the NFI OpenStack Agent 113 and the OpenStack controlled Cloud 123.

Further referring to FIG. 4, in an exemplary embodiment, NFI Server 110 provides network flow information, including but not limited to the OSI Level 7 application-level data that enables the NFI OpenStack Agent 122 to make intelligent decisions how to utilize the Cloud 125 computing resources.

The NFI OpenStack Agent 122 receives information about the flows, including but not limited to the OSI Level 7 application information and user identity information from the NFI Server 110 via a protected communications channel 121.

The OSI Level 7 application information may be supplied by means of a classification such as PANA-L7 accompanied by an application identifier or other similar application classification. The communications channel 121 may be protected by standard cryptographic means such as the SSL/TLS or the DTLS protocol.

The NFI Server 110 receives OSI Level 7 application information in NetFlow messages generated by the network devices 102 and derives user information from the user identity aware NetFlow messages such as NetFlow Security Event Log (NSEL) or in the OSI Layer 2 extensions such as Cisco Secure Group Tags (SGT).

In an exemplary embodiment, System Administrator configures policies for Virtualized Devices 125 provisioning and maintenance on the NFI OpenStack Agent 122. The policies could be expressed, without any limitation, as an XML document, in a proprietary format, etc. The policies could be based on the application type derived from the OSI Level 7 application information, user or group identity, user or group role, time of day, etc.

An exemplary policy configured by the System Administrator on the NFI OpenStack Agent 122 could be creating additional Virtualized Devices 125 when a demand for a particular application increases, provisioning additional resources to the existing Virtualized Devices 125, migration of existing Virtualized Devices 125 to more powerful hardware within the Cloud 123, shutting down idle Virtualized Devices 125, etc.

By utilizing NetFlow 111 information, the NFI OpenStack Agent 122 is able to automate Cloud 123 management, thus reducing the cloud provider's or cloud owner's operational costs and improving utilization of the physical hardware resources.

It is appreciated that OpenStack is an example of a cloud operating system and the method disclosed herein is applicable to any vendor specific or generic cloud operating system.

NFI for Virtualized Environment

It is appreciated that the NFI Server, combined with NFI OpenFlow Agent and NFI OpenStack Agent becomes a linchpin of an integrated virtualized environment which includes an OpenFlow-based software defined network and an OpenStack driven cloud infrastructure.

Figure 5:
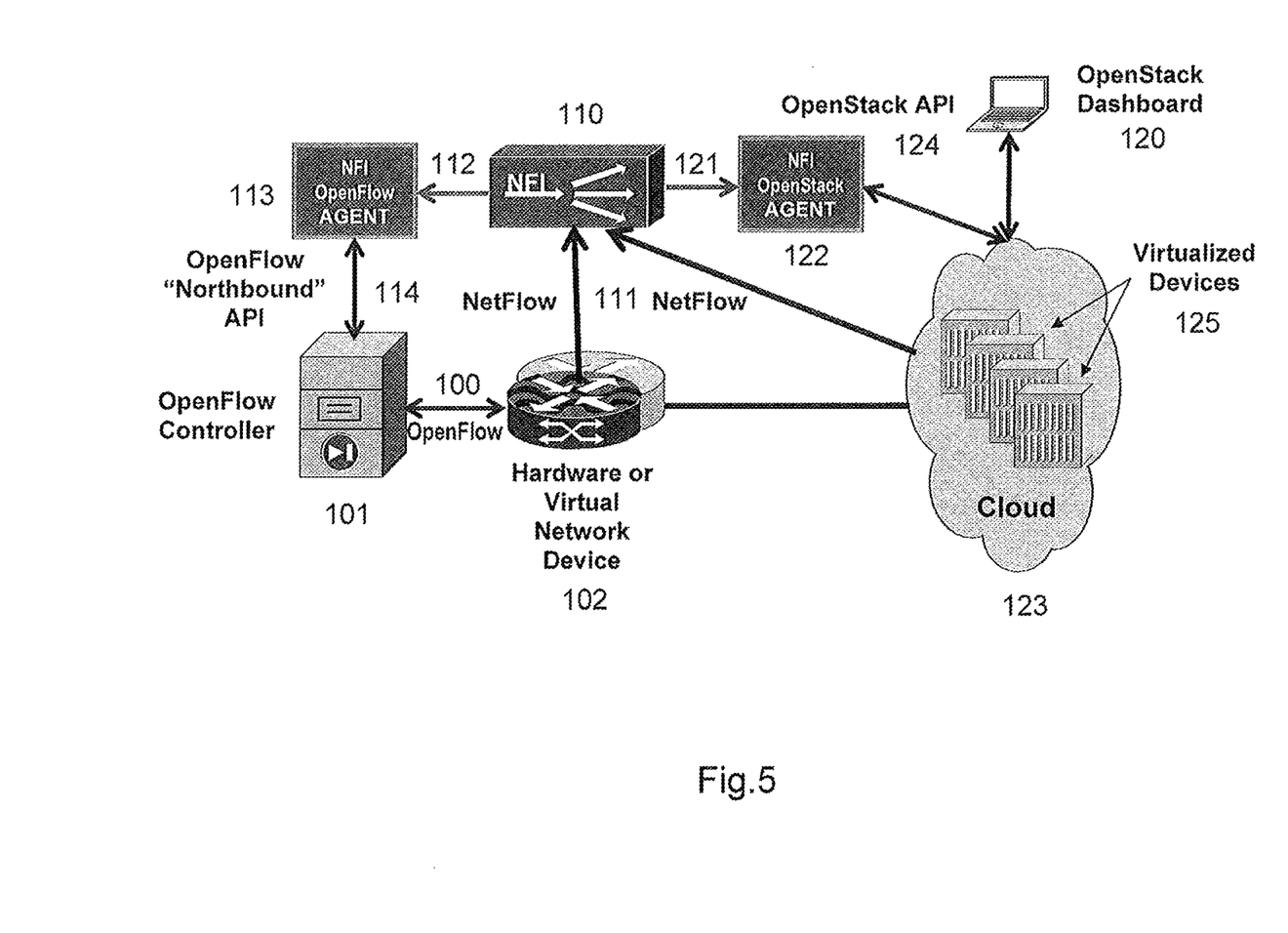
FIG. 5 provides a somewhat simplified schematic diagram of a software-defined network and cloud-based computing environment, including modules that cooperate to analyze metadata in accordance with an embodiment of the present invention.

FIG. 5 illustrates the NFI Server 110 application to an integrated setting which includes software defined networking and a cloud computing environment.

Further referring to FIG. 5, the NFI Server 110 processes NetFlow information 111 generated by Hardware or Virtual Network Devices 102 and Virtualized Devices 125 and communicates consolidated flow data to the NFI OpenStack Agent 122 implemented as an application capable of communicating with the OpenStack controlled Virtualized Devices 125 deployed in the Cloud 123. In an exemplary embodiment, the communication between the NFI OpenStack Agent 122 and the OpenStack controlled Cloud 123 may be implemented by means of the OpenStack API 124 which supports bi-directional communications between the NFI OpenStack Agent 113 and the OpenStack controlled Cloud 123.

Further referring to FIG. 5, NFI Server 110 processes NetFlow information 111 generated by OpenFlow compliant networking devices 102 and Virtualized Devices 125 and communicates consolidated flow data to the NFI OpenFlow Agent 113 implemented as an application capable of communicating with the OpenFlow Controller 101. In an exemplary embodiment, the communication between the NFI OpenFlow Agent 113 and the OpenFlow Controller 101 may be implemented by means of the OpenFlow "Northbound" API 114 which supports bi-directional communications between the NFI OpenFlow Agent 113 and the OpenFlow Controller 101.

Due to a unique position of the NFI Server 110 in the virtualized computing environment, its interaction with the OpenStack controlled Cloud 123 and the OpenFlow Controller 101 results in a robust control mechanism which unifies Cloud 123 computational resources driven by the OpenStack protocol and the networking resources overseen by the OpenFlow Controller 101 thus creating a novel computing paradigm of a Flow Controlled Computing Platform.

It is appreciated that the NFI Server 110 may interact with a plurality of Clouds 123 and a plurality of OpenFlow Controllers 101.

It is also appreciated that for interacting with a software defined network, a protocol other than OpenFlow may be utilized and an API other than OpenStack may be employed for controlling virtualized computing resources.

On-Demand NetFlow Information

Flow information data is notoriously voluminous: a single mid-range router like Cisco ASR1000 is capable of producing 400,000 NetFlow records per second which results in around 1.6 TB of data per day. Due to a high rate and volume of data, many of the NFI policies are designed to consolidate and/or filter the data and report only a greatly reduced volume of essential information to a backend system, such as without limitation, a SIEM system.

Typically, consolidated information provided by NFI is sufficient for the backend system but under certain circumstances, especially in security related situations, the backend system may need more information about the conditions which preceded the event in question and conditions immediately after the event. By taking into consideration the event context, the backend system may be in a much better position to determine the scope and the consequences of the observed event.

For example, consider a case in which a SIEM system received a notification about a configuration change on a sensitive device D by user A. At first glance this event does not deserve scrutiny because user A may be authorized to configure device D and has sufficient credentials to access device D and make a configuration change. But if the SIEM system is also receiving data from NFI, it may now be capable of correlating the configuration change action with the location on the network from where the configuration change request was issued. A case when a request for configuration change was issued from a network location other than a network location with which user A was associated at the time of the configuration change event can signify an impersonation attack.

It is appreciated that the above impersonation attack cannot be detected by the means of the authentication and authorization systems only. From the point of view of the authentication and authorization systems, the configuration change is totally legitimate since the actor possesses valid access credentials.

An embodiment of the NFI on-demand flow information mechanism disclosed in this invention enables the SIEM system to receive information required for correlating network information with other machine data a posteriori without the need of constantly processing all of what may be a huge flow of inbound network data.

Figure 6:
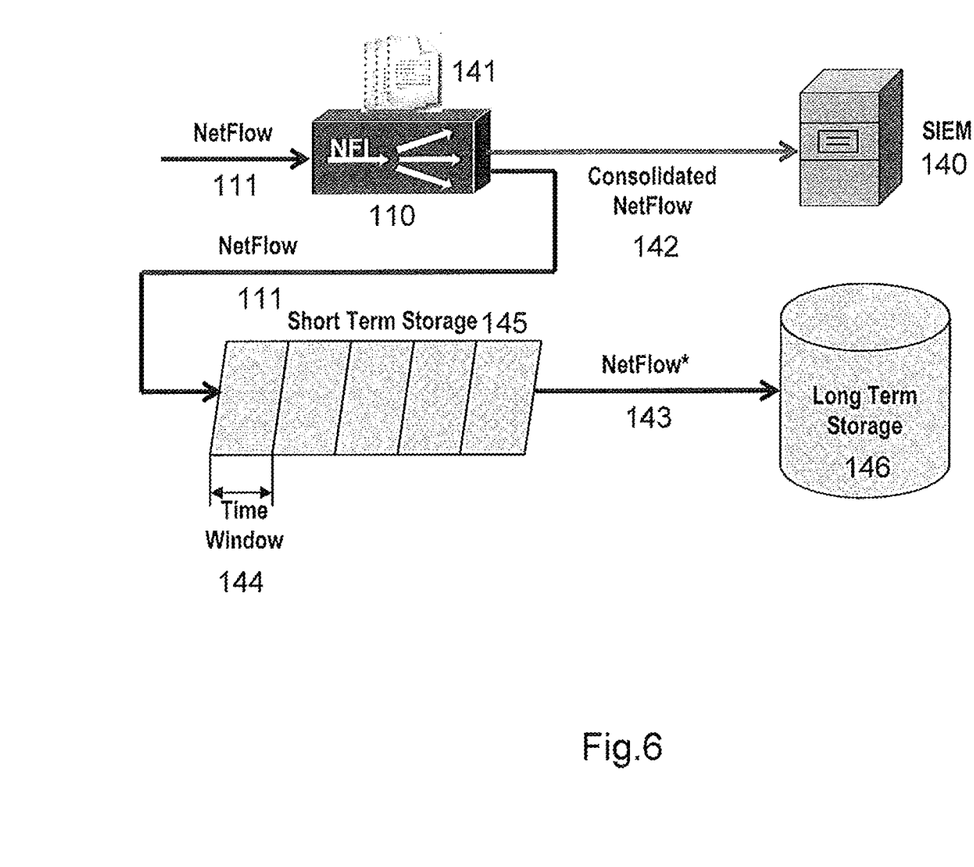
FIG. 6 is a simplified schematic diagram that illustrates an embodiment of the present invention in which short term storage is incorporated in order to provide on-demand NetFlow information.

Referring to FIG. 6, in another exemplary embodiment, NFI Server 110 receives NetFlow data 111 from one or a plurality of network devices. By means of a configured collection of NFI Policies 141, NFI Server 110 processes NetFlow data 111 and reports Consolidated NetFlow data 142 to a SIEM System 140 in a format understood by the SIEM System 140.

Simultaneously with such actions, NFI Server 110 propagates received NetFlow data 111 to the Short Term Storage 145 where the NetFlow data 111 is placed into the leftmost Time Window 144.

In an exemplary embodiment, Short Term Storage 145 is a repository with a small access time, possibly in RAM, on SSD or some other fast and/or local storage device. Logically, Short Term Storage 145 may be split into a configurable number of sections, e.g., Time Windows 144, each of which contains NetFlow data 111 information received over a configurable period Δt. Short Term Storage 145 generally implements a sliding window schema in which after each period Δt the right-most Time Window 144 in an augmented NetFlow format 143 is forwarded to the Long Term Storage 146, the Short Term Storage 145 logically shifts and new left-most Time Window 144 is created for storing the incoming NetFlow data 111 information. The Long Term Storage 146 generally has an access time and storage capacity that is greater or equal to the Short Term Storage 145 access time and storage capacity.

It is appreciated that augmented NetFlow format 143 may be the same as the original NetFlow data 111 or may contain additional mark up information for use in the long term storage.

In an exemplary embodiment, SIEM system 140 may execute a Set of Policies 150 which consume Consolidated NetFlow data 142 supplied by NFI Server 110 and, optionally, Other Machine Data 153. If in the process of execution of a policy from the Set of Policies 150, SIEM system 140 detects an Event 151 which took place at time T, SIEM system 140 can issue a Request 152 to the NFI Server 110 to provide additional NetFlow 111 data received by the NFI Server 110 during a time interval [T−t, T+t], where t is the interval half-width selected by the SIEM system 140.

Upon receiving the SIEM system 140 Request 152, the NFI Server 110 determines location of the requested information in the storage based on the beginning time and the ending time of the requested time interval [T−t, T+t]. Assuming that at the time of Request 152 the Short Term Storage 145 contains NetFlow 111 data corresponding to the time interval [T1, T2], T2≥T1, and the requested time interval [T−t, T+t] is within the Short Term Storage 145 time interval [T1, T2], then the NFI Server 110 retrieves requested information from the Short Term Storage 145 and forwards 156 the retrieved information, optionally with additional processing, to the SIEM system 140.

If the requested time interval [T−t, T+t] is outside of the Short Term Storage 145 time interval [T1, T2], then the NFI Server 110 attempts to retrieve the requested information from the Long Term Storage 146 and if successful, upon optionally with additional processing, forwards the retrieved information in Response 156, to the SIEM system 140.

If the requested time interval [T−t, T+t] is split between the Short Term Storage 145 time interval [T1, T2] and the Long Term Storage 146, then the NFI Server 110 retrieves first part of the requested information from the Short Term Storage 146 and the second part of the requested information from the Long Term Storage 146, concatenates the first retrieved part and the second retrieved part of information and forwards the concatenated information, optionally with additional processing, in Response 156 to the SIEM system 140.

In a case when the right boundary T+t of the requested time interval [T−t, T+t] is outside of the time range of the information in the Long Term Storage 146, or the left boundary T−t of the requested time interval [T−t, T+t] is outside of the time range of the information in the Short Term Storage 145, the NFI Server 110 retrieves information for a truncated time range and notifies the SIEM system about the truncation in Response 156.

In the case in which the requested time interval [T−t, T+t] is outside of the time range covered by the Short Term Storage 145 and the Long Term Storage 146, the NFI server 110 notifies the SIEM system about the error condition in Response 156.

The novel multi-tiered approach to storing NetFlow data disclosed herein provides a significant advantage when analyzing events which require immediate reporting or action as compared to the traditional single tiered NetFlow information storage used by prior NetFlow collectors. For the events which require immediate reporting or action, search for the requested information in the fast Short Term Storage 145 is significantly faster than in a slower Long Term Storage 146 which results in a better response time of the SIEM system 140.

It is appreciated that the SIEM system 140 request 152 for additional information may include, besides specifying the time interval, other parameters such as the origin of the NetFlow record, specific flow information, such as, without limitation, a source or destination IP addresses, or a combination thereof. It is also appreciated that NetFlow information in the Short Term Storage 145 and the Long Term Storage 146 may be indexed by time and by zero, one or a plurality of keys based on the information pertinent to the NetFlow such as without limitation, source or destination IP addresses, source or destination OSI Layer 4 ports, and so on.

Figure 7:
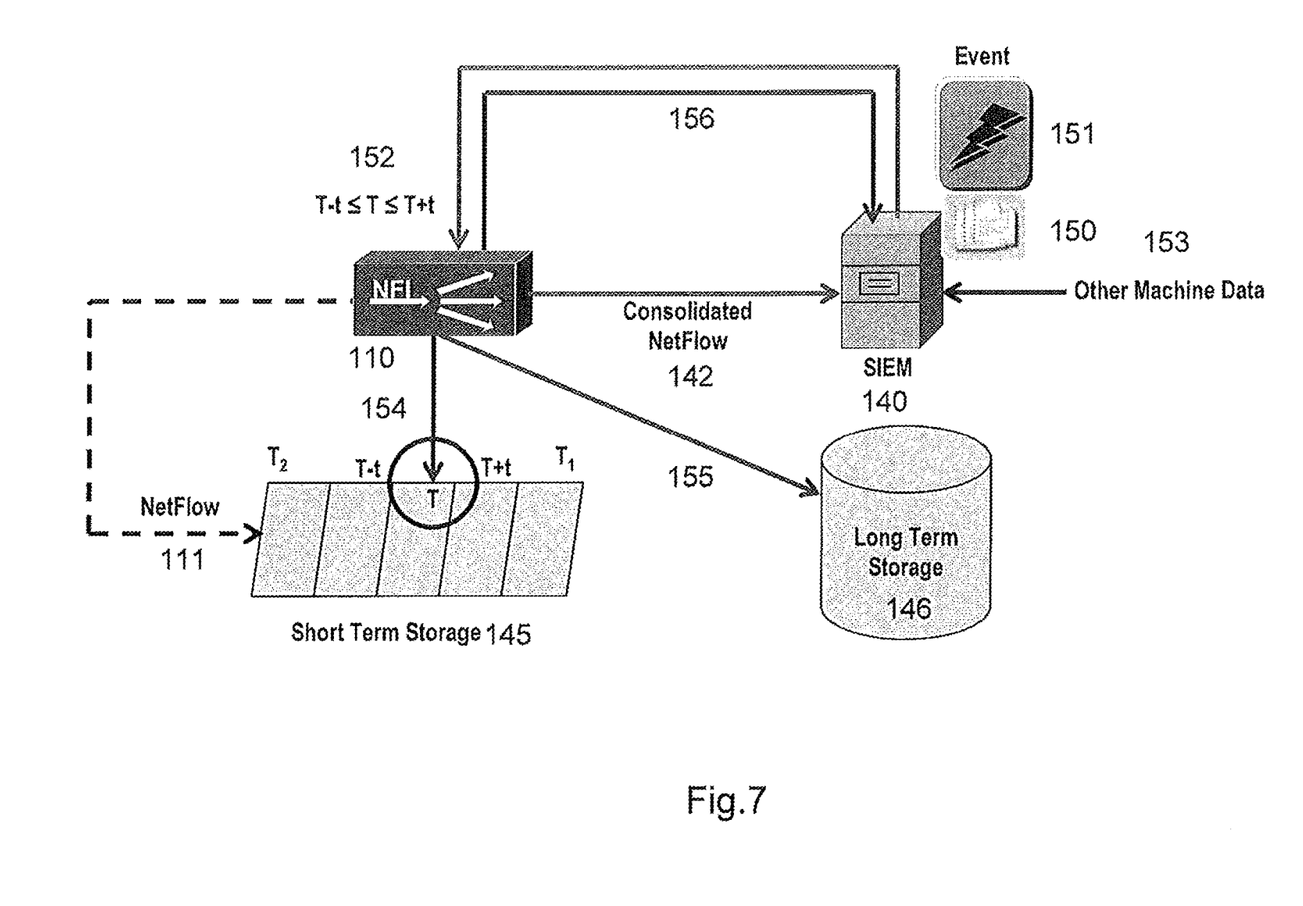
FIG. 7 provides another simplified schematic diagram that illustrates an alternative embodiment of the present invention in which short term storage is incorporated in order to provide on-demand NetFlow information.

Further referring to FIG. 7, it is appreciated that the Short Term Storage 145 and the Long Term Storage 146 may be operated by the NFI Server 110, by an instance of the NFI Server 110 other than the instance of the NFI Server 110 which originally processed NetFlow data 111, and/or by a process other than an NFI Server 110. It is also appreciated that the Short Term Storage 145 and the Long Term Storage 146 may be operated by different instances of the NFI Server 110 or by a process other than the NFI Server 110. Furthermore, the access time to the Short Term Storage 145 and the Long Term Storage 146 may be same and there may be a plurality of more than two storage tiers. It is also appreciated that the Long Term Storage 146 is an optional component and the information in the Short Term Storage 145 may be discarded when it ages past a configured life span.

A novel approach to associating network and other machine data disclosed herein enables detection of attacks which would be undetected if only the network or other machine data is taken into consideration. A novel approach to the network information storage disclosed here enables provision of the network information on the "only when needed" basis without any preliminary processing.

Figure 8:
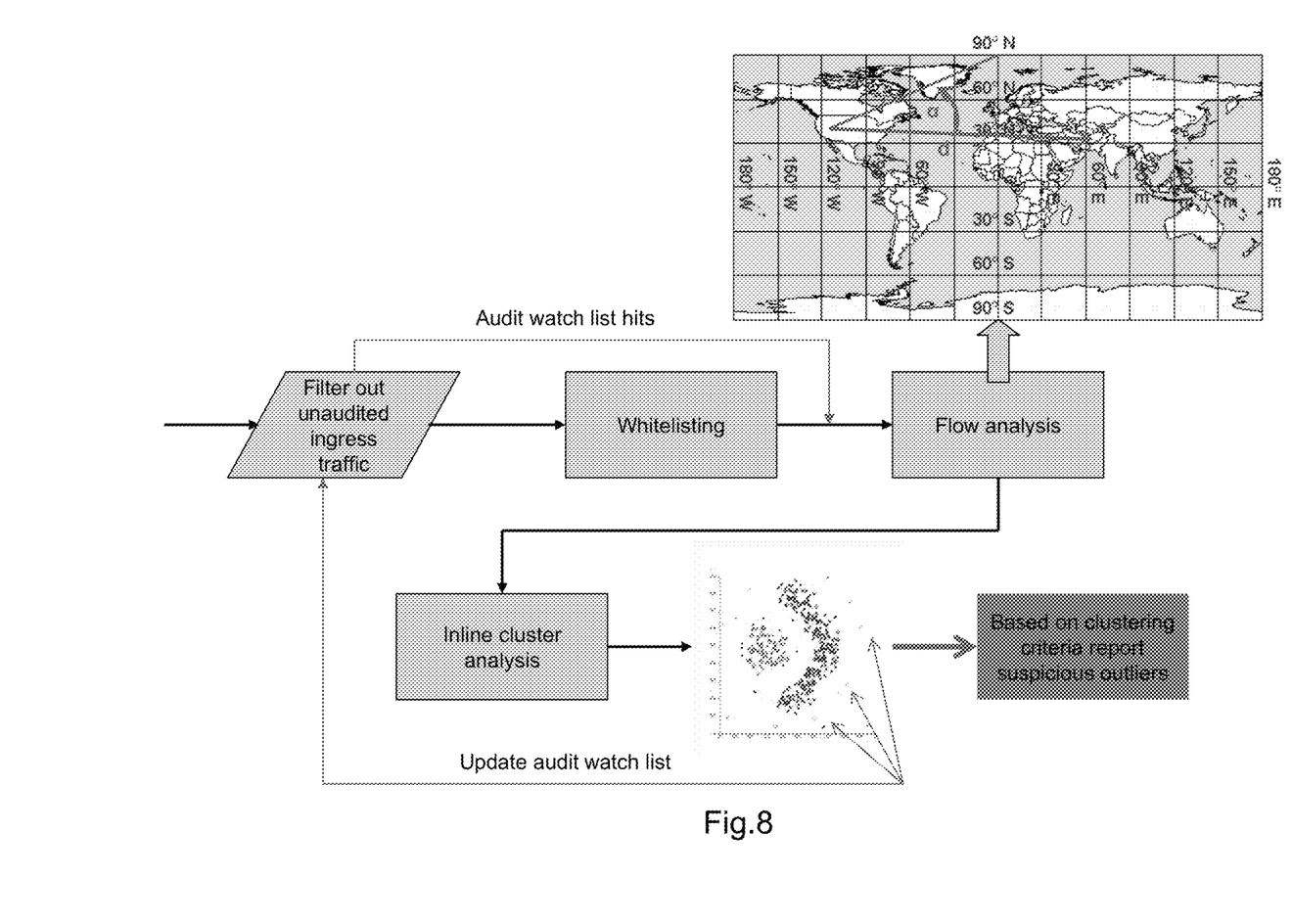
FIG. 8 provides a simplified schematic diagram illustrating an embodiment of the present invention in which botnets may be detected using geo-spatial analysis.

Geo-Spatial Analysis-Based Botnet Slaves Detection (See FIG. 8)

Sophisticated malware agents engage complex evasion detection techniques when communicating with their masters. For example, an agent can contact the master at random time intervals, communicate with multiple masters by selecting next master based on information received during last communication session, obfuscate Command & Control channel traffic patterns, etc.

Method

Use inline cluster analysis algorithm (BIRCH—Balanced Iterative Reducing and Clustering using Hierarchies) to classify outbound traffic. BIRCH is known for efficiently determining "outliers"—i.e., data points that are not a part of the general underlying pattern.

Feature Set
S={Si}, Si∈{freq(dist, az), app, f1, f2, f3, f4, T}
freq—communications frequency
dist—physical distance to the destination host
az—azimuth
app—L7 application id or L4 destination port
f1—flow rate, flows/h
f2—number of packets per flow
f3—packet size, B
f4—traffic rate, bps "dist" and "az" are computed based on the source and destination IP addresses found in the flow record. Similarity function, "freq", is frequency of communications to a particular geographic area. Applications are classified into groups each of which is associated with a category assigned to a monitored host ("standard applications").

Reporting Criteria

Alert to unique or infrequent communications with a peer by a non-standard application or a standard application with unusual traffic characteristics.

Penetration Testing, Configuration Verifiers)

As a network grows in size, its topology becomes more complex. Topology complexity, in turn, increases configuration complexity and makes it more error prone. There are a number of tools which help a System Administrator to assess and validate configuration and security posture of the networks under his management. These tools use a variety of methods to determine vulnerabilities in the network. For example, penetration testing tools "attack" an organization's firewalls, configuration verification tools attempt to find loopholes in the authentication and authorization policies, IDS/IPS systems watch the traffic flowing in and out of an organization's network, and so on. These protective technologies were developed over a long period and are mature enough to stop known and sometimes even unpredicted threats.

A problem with the today's network defensive posture is its static nature: once configured, and possibly verified, network defenses are considered impregnable like the Maginot Line was before the World War II. The protective measures are generally applied once, or at best, are assessed once in a while, leaving the organization without any quality assurance of the real security posture state in between the checks.

Yet another problem of today's network defenses is the diversity of methods how these protective elements are provisioned and configured. It is very infrequent that all nodes in the protective grid are sourced from a single vendor. A common IT practice is to use best of breed devices which obviously come from diverse network technology providers. Diverse and complex configuration methods increase the probability of error in today's multi-tiered network security deployments.

NetFlow is a technology which enables creation of the tools capable of providing dynamic quality control of the organization's networking infrastructure. NFI technology, disclosed in this invention, allows introducing arbitrary policies which could monitor network traffic throughout the organization and identify flow instances which were overseen by statically configured defenses.

While this invention has been described in terms of several embodiments, there are alterations, modifications, permutations, and substitute equivalents, which fall within the scope of this invention. Although sub-section titles have been provided to aid in the description of the invention, these titles are merely illustrative and are not intended to limit the scope of the present invention.

It should also be noted that there are many alternative ways of implementing the methods and apparatuses of the present invention. It is therefore intended that the following appended claims be interpreted as including all such alterations, modifications, permutations, and substitute equivalents as fall within the true spirit and scope of the present invention.

What is claimed is:

1. A method of improved management of a software-defined network, said network including a network controller and transmitting network traffic using one or more network protocols, the network including devices at least some of which receive network traffic through an ingress interface and transmit network traffic through an egress interface, the method comprising the steps of:
   setting up communication paths with an OpenFlow controller;
   receiving network metadata from a plurality of sources in a computing device, in at least one data format;
   processing said network metadata, in real time as it is received, while said network metadata is in transition on said network between a network device that generated said network metadata and a device that is able to store said network metadata to retrieve Open Systems Interconnection (OSI) layer 7-information therefrom; and
   determining as a result of said metadata processing step, information relating to applications operating on said network;
   deriving user identity information from user-identity-aware NetFlow messages;
   mapping the information relating to applications operating and the user identity information to a policy provided by a system administrator;
   determining a state of the software-defined network;
   determine if the applications operating and the user identify satisfy the policy; and
   rerouting network traffic around unauthorized network devices by the network controller if the policy is not satisfied, by modifying lower level packet forwarding decisions of the OpenFlow controller with the information relating to applications operating and the user identity information.

2. The method as set forth in claim 1, further comprising the steps of:
   determining as a result of said metadata processing step, information relating to the users present on said network.

3. A method of improved management of a cloud-based virtual computing environment, said environment including a cloud operating system and a cloud environment controller and transmitting network traffic using one or more network protocols, the network including devices at least some of which receive network traffic through an ingress interface and transmit network traffic through an egress interface, the method comprising the steps of:

setting up communication paths with an OpenFlow controller;

receiving network metadata, in a computing device, from a plurality of sources in said cloud-based virtual computing environment, in at least one data format;

processing said network metadata, in real time as it is received, while said network metadata is in transition in said environment between a network device that generated said network metadata and a device that is able to store said network metadata to retrieve Open Systems Interconnection (OSI) layer 7 information therefrom; and determining as a result of said metadata processing step, information relating to applications operating in said environment;

deriving user identity information from user-identity-aware NetFlow messages;

mapping the information relating to applications operating and the user identity information to a policy provided by a system administrator;

determining a state of the cloud-based virtual computing environment;

determine if the applications operating and the user identify satisfy the policy; and rerouting network traffic around unauthorized network devices by the network controller if the policy is not satisfied, by modifying lower level packet forwarding decisions of the OpenFlow controller with the information relating to applications operating and the user identity information.

4. The method as set forth in claim 3, further comprising the steps of:

determining as a result of said metadata processing step, information relating to the users present in said environment.

5. A system for improved management of a software-defined network, said network including a network controller and transmitting network traffic using one or more network protocols, the network including devices with memory at least some of which receive network traffic through an ingress interface and transmit network traffic through an egress interface and generate network metadata relating to said network traffic, said management system comprising:

an Open Flow controller for setting up communication paths;

at least one ingress interface for receiving network metadata from a plurality of sources in a software-defined network, in at least one data format;

a processing engine within a computing device for processing said network metadata, in real time as it is received, while said network metadata is in transition on said network between a network device that generated said network metadata and a device that is able to store said network metadata to retrieve Open Systems Interconnection (OSI) layer 7 information therefrom;

said processing engine deriving user identity information from user-identity-aware NetFlow messages, determining information relating to applications operating on said network, mapping the information relating to applications operating and user identity information to a policy provided by a system administrator, determining a state of the software-defined network, determine if the applications operating and the user identify satisfy the policy, and rerouting network traffic around unauthorized network devices by the network controller if the policy is not satisfied, by modifying lower level packet forwarding decisions of the Open Flow controller with the information relating to applications operating and the user identity information.

6. The management system as set forth in claim 5, wherein said processing engine determines as a result of said metadata processing step, information relating to the users present on said network.

7. A system for improved management of a cloud-based virtual computing environment, said environment including a cloud operating system and a cloud environment controller that transmits network traffic using one or more network protocols, the network including devices with memory at least some of which receive network traffic through an ingress interface and transmit network traffic through an egress interface, the management system further comprising:

an Open Flow controller for setting up communication paths;

an interface for receiving network metadata from a plurality of sources in said cloud-based virtual computing environment, in at least one data format;

a processing engine within a computing device for processing said network metadata, in real time as it is received, while said network metadata is in transition in said environment between a network device that generated said network metadata and a device that is able to store said network metadata to retrieve Open Systems Interconnection (OSI) layer 7 information therefrom;

said processing engine deriving user identity information from user-identity-aware NetFlow messages, determining, as a result of said metadata processing step, information relating to applications operating to a policy provided by a system administrator, mapping the information relating to applications operating and user identity information to the policy, determining a state of the environment, determine if the applications operating and the user identify satisfy the policy, and rerouting network traffic around unauthorized network devices by the network controller if the policy is not satisfied, by modifying lower level packet forwarding decisions of the OpenFlow controller with the information relating to applications operating and the user identity information.

8. The management system as set forth in claim 7, wherein said processing engine determines as a result of said metadata processing step, information relating to the users present in said environment.

* * * * *